United States Patent
Kim et al.

(10) Patent No.: US 6,842,814 B1
(45) Date of Patent: Jan. 11, 2005

(54) METHOD FOR MANAGING A DIGITAL INTERFACE CONNECTION

(75) Inventors: Do-hyoung Kim, Kyungki-do (KR); Il-ju Na, Seoul (KR); Jong-wook Park, Suwon (KR); Goan-soo Seong, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 499 days.

(21) Appl. No.: 09/626,078

(22) Filed: Jul. 26, 2000

(30) Foreign Application Priority Data

Jul. 26, 1999 (KR) ........................................ 1999-30341

(51) Int. Cl.[7] ............................ G06F 13/14; G06F 3/00; G06F 13/00
(52) U.S. Cl. ........................... 710/305; 710/38; 710/110
(58) Field of Search ..................... 345/823; 370/355; 375/219; 709/223; 710/305

(56) References Cited

U.S. PATENT DOCUMENTS

| | | | |
|---|---|---|---|
| 6,061,794 A | 5/2000 | Angelo et al. | ............... 713/200 |
| 6,134,662 A | 10/2000 | Levy et al. | ................... 713/200 |
| 6,546,419 B1 * | 4/2003 | Humpleman et al. | ........ 709/223 |

FOREIGN PATENT DOCUMENTS

| | | | |
|---|---|---|---|
| JP | 10-198637 A | 7/1998 | |
| JP | 11-187061 A | 7/1999 | |
| WO | 99/07126 | 2/1999 | ........... H04L/29/06 |

* cited by examiner

Primary Examiner—Glenn A. Auve
Assistant Examiner—Christopher E. Lee
(74) Attorney, Agent, or Firm—Sughrue Mion, PLLC

(57) ABSTRACT

A method for managing the connection of a plurality of devices connected by a digital is provided. The method includes operation modes having a normal mode for performing a usual operation specified in the relevant digital interface standard and a private mode for performing an operation selectively controlling the external device, and includes: (a) a user sending a command requesting an operation mode be established in a private mode to a first arbitrary device; (b) the first device establishing the private mode as the operation mode in response to the user's command; (c) the first device identifying devices having the right to access related registers to store in the first device information relating to the identified devices; (d) the first device determining whether there is a request for access to the related registers by a third-party device; (e) determining whether the third-party device is included in the previously stored devices if there is a request; (f) the first device accepting a request of the third-party device if the third-party device is determined to be included in the previously stored devices; and (g) the first device returning an error code to the third-party device, which indicates that the first device cannot accept the request, if the third-party device is not determined to be included in the previously stored devices. Thus, privacy can be ensured in a connection between digital devices.

4 Claims, 4 Drawing Sheets

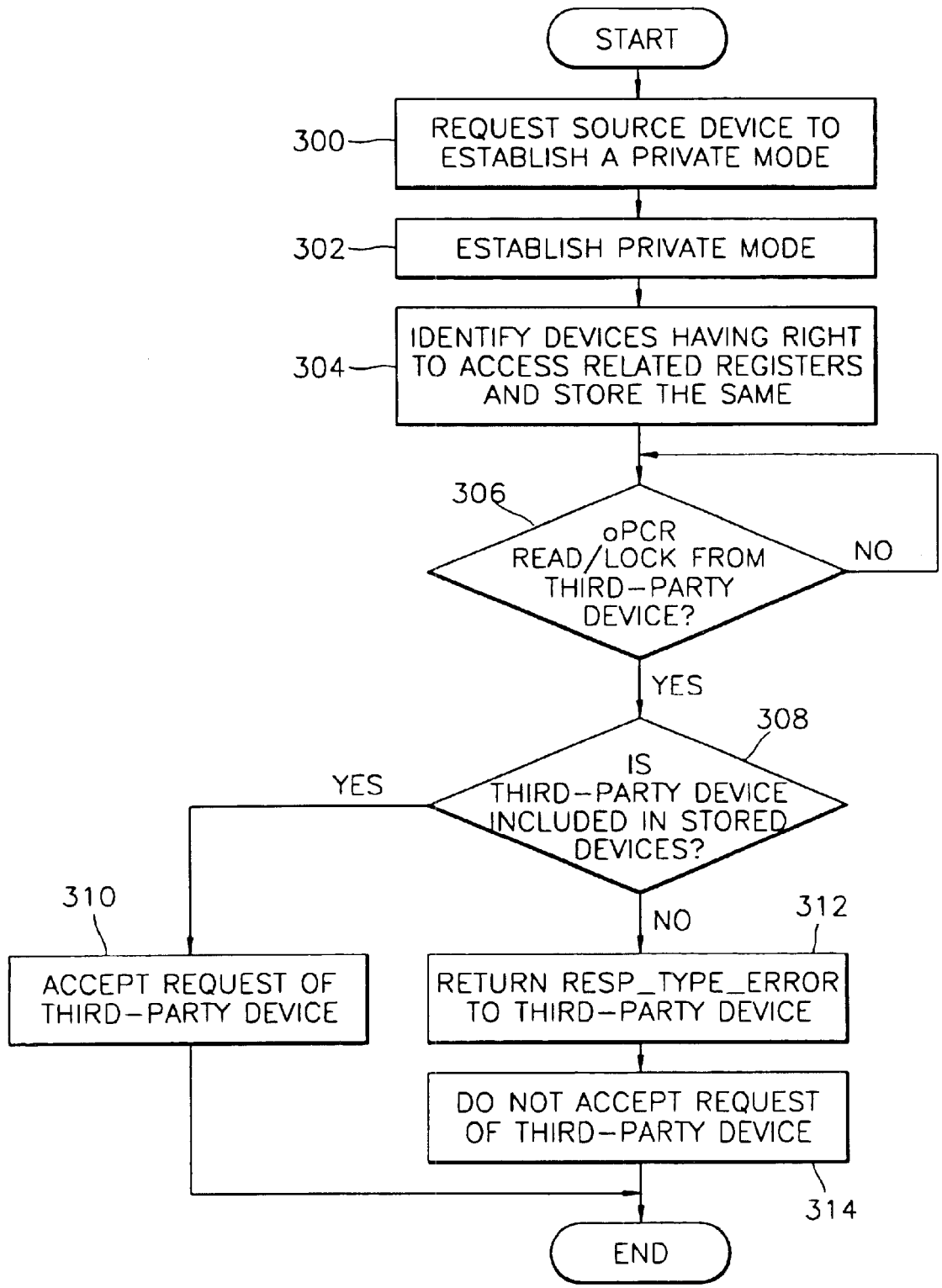

METHOD FOR MANAGING A DIGITAL INTERFACE CONNECTION

BACKGROUND OF THE INVENTION

1. Field of the Invention

The present invention relates to a method for managing the connection of digital devices connected to a digital interface through the digital interface, and more particularly, to a method for managing a digital interface in which, when a connection is established between digital devices connected through a digital interface such as The Institute of Electrical and Electronics Engineers, Inc., (IEEE) 1394, access by a third-party device can be controlled through the connection.

2. Description of the Related Art

A plurality of digital devices can be interconnected through a digital interface which conforms to an interface standard such as the IEEE 1394 standard, and a method for managing the connections between those digital devices is prescribed in the International Electrotechnical Commission (IEC) 61883 standard. According to the IEC 61883 standard, input and output plugs are defined for each digital device as the entry of an incoming bit stream and the exit of an outgoing bit stream, respectively. Further, the input and output plugs are controlled by managing registers, such as an output master plug register (oMPR), an output plug control register (oPCR), an input master plug register (iMPR), and an input plug control register (iPCR), so that the connection between the digital devices can be managed.

There are two types of connections made between such digital devices: point-to-point connection and broadcast connection. A point-to-point connection is a connection consisting of output and input plugs and a channel therebetween. The connection can be established and overlaid by an arbitrary device, and the device by which the connection is established manages this connection. The broadcast connection is divided into broadcast-in and broadcast-out connections. The broadcast-in is a connection between an input plug and a channel while the broadcast-out is a connection between an output plug and a channel. The broadcast connection can only be established by a device that actually inputs and outputs a bit stream by the broadcast connection, and can only be released by an arbitrary device in the network. All management of the connection, including establishment or release of the point-to-point connection and the broadcast connection, is performed by managing registers such as oMPR, oPCR, iMPR, and iPCR.

FIG. 1 is a diagram for explaining a conventional method for managing connections. FIG. 2 shows the connection related fields oPCR and iPCR that are used in the IEC61883 standard. Referring to FIGS. 1 and 2, a DVCR 10, a first DTV 12, and a second DTV 14 are connected via a IEEE interface. Further, it is assumed that DVCR 10, which is a source device, and first DTV 12, which is a sink device, are connected through a number 33 isochronous channel.

If this connection is a point-to-point connection, the content of the oPCR of DVCR 10 is oPCR.P-2-P_Connection_Counter(P-2-Pcnt)=1, oPCR. Channel_Number (nCh)=33. The content of the iPCR of first DTV 12 is iPCR.P-2-P_Connection_Counter(P-2-Pcnt)=1, iPCR.Channel_Number(nCh)=33. Further, if the operation of the iPCR and oPCR is performed successfully, a point-to-point connection of DVCR 10 and first DTV 12 is considered to be established. The IEEE 1394 modules of DVCR 10 and first DTV 12 are controlled by connection establishment information denoting the connection establishment state of the point-to-point connection, thereby allowing first DTV 12 to receive and see the output content of DVCR 10.

When a connection is established between DVCR 10 and first DTV 12 as described above, if second DTV 14, which is a sink device, is to monitor the output content of DVCR 10, second DTV 14 attempts to establish a point-to-point connection or broadcast-in connection with DVCR 10 by overlaying the connection on the already established point-to-point connection between DVCR 10 and first DTV 12.

In the case where a point-to-point connection is overlaid and established between second DTV 14 and DVCR 10, the content of the oPCR of DVCR 10 is oPCRP-2-P_Connection_Counter(P-2-Pcnt)=2, oPCR.Channel_Number (nCh)=33. The content of the iPCR of second DTV 12 is iPCR.P-2-P_Connection_Counter(P-2-Pcnt)=1, iPCR. Channel_Number (nCh)=33. According to such information, second DTV 14 controls its own IEEE 1394 module, which allows it to receive and see the output content of DVCR 10.

Further, in the case where a broadcast-in connection is overlaid and established between second DTV 14 and DVCR 10, the content of oPCR of DVCR 10 is oPCR.P-2-P_Connection_Counter(P-2-Pcnt)=1, oPCR.Broadcast_Connection_Counter (Boutcnt)=1, oPCR.ChannelNumber (nCh)=33. The content of the iPCR of second DTV 14 is iPCR.Broadcast_Connection_Counter (Bincnt)=1, iPCR.Channel_Number (nCh)=33. In the same manner, second DTV 14 controls its own IEEE 1394 module according to such information, thereby allowing it to monitor the output content of DVCR 10.

Further, if a broadcast connection is made between DVCR 10 and first DTV 12, the content of the oPCR of DVCR 10 is oPCR.Broadcast_connection_Counter(Bincnt)=1, oPCR. Channel_Number (nCh)=33. The content of the iPCR of first DTV 12 is iPCR.Broadcast_Connection_Counter (Bincnt)=1, iPCR. Channel_Number(nCh)=33. In such a manner, if the operation of the iPCR and oPCR is performed successfully, it is considered that a broadcast-out connection is established in DVCR 10 through channel number 33 while a broadcast-in connection is established in first DTV 12 through channel number 33.

The IEEE 1394 modules of DVCR 10 and first DTV 12 are controlled by connection establishment information denoting the state of the establishment of the broadcast connection. Thus, DVCR 10 outputs a bit stream to channel number 33 and first DTV 12 receives the output of channel number 33, thereby allowing first DTV 12 to see the output of DVCR 10. If second DTV 14, which is a sink device, is to see the current output content of DVCR 10 when a connection is established between DVCR 10 and first DTV 12 in such a manner, second DTV 14 attempts to overlay a point-to-point connection on the already established point-to-point connection or to establish a broadcast-in connection with DVCR 10. In the case where a point-to-point connection is overlaid and established between second DTV 14 and DVCR 10, the content of the oPCR of DVCR 10 is oPCR.P-2-P_Connection_Counter(P-2-Pcnt)=1, oPCR.Broadcast_Connection_Counter (Boutcnt)=1, oPCR.Channel_Number (nCh)=33. The content of the iPCR of second DTV 12 is iPCR.Broadcast_Connection_Counter (Bincnt)=1, iPCR. Channel_Number (nCh)=33. Second DTV 14 controls its own IEEE 1394 module according to such information, thereby allowing it to receive and see the output content of DVCR 10. In the case where a broadcast-in connection is established between second DTV 14 and DVCR 10, the content of the oPCR of DVCR 10 is oPCR.P-2-P_Connection_Counter(P-2-Pcnt)=1, oPCR.Broadcast_Connection_Counter(Boutcnt)=1, oPCR.Channel_Number (nCh)=33. The content of the iPCR of second DTV 14 is iPCR.Broadcast_Connection_Counter(Bincnt)=1, iPCR.Channel_Number(nCh)=33. Also, second DTV 14 controls its own IEEE 1394 module according to such information, thereby allowing it to receive and monitor the output content of DVCR 10.

According to the conventional method for managing the connections to a digital interface, when a bit stream is transmitted through an existing point-to-point or broadcast connection between source and sink devices, another device may access the content flowing through the existing connection without the authority of the user, so that free access by other device is allowed. For example, assuming that DVCR 10 and first DTV 12 are both in the parents' room and second DTV 14 is a DTV in the children's room, the content of a bit stream of the VCR watched by the parents can be accessed without any restriction. In other words, the conventional method for managing a digital interface connection has a problem in that a third-party device can arbitrarily access the existing connection, so that privacy cannot be protected when digital devices are connected.

SUMMARY OF THE INVENTION

To solve the above problem, it is an object of the present invention to provide method for managing a digital interface connection in which, when a connection is established between digital devices, the user of the existing connection is able to control the access by a third-party device of a bit stream transmitted through the connection.

Accordingly, to achieve the above object of the present invention, a method is provided for managing a digital interface connection of a plurality of devices connected by the digital interface, the plurality of devices including operation modes having a normal mode for performing a usual operation prescribed in a digital interface standard and a private mode for performing an operation which selectively controls the external device. The method includes: (a) the user sending a command requesting an operation mode to be established in a private mode to a first arbitrary device; (b) establishing the private mode as the operation mode in the first device in response to the user's command; (c) the first device identifying devices having the right to access related registers to store in the first device information relating to the identified devices; (d) the first device determining whether there is a request for access to the related registers by a third-party device; (e) determining whether the third-party device is included in the previously stored devices, if there is a request; (f) the first device accepting a request by the third-party device, if the third-party device is determined to be included in the devices stored in (e); and (g) the first device returning an error code to the third-party device, which indicates that the first device cannot accept the request, if the third-party device is not determined to be included in the devices stored in (e). In the method, (a) may include: (a-1) the user sending a request indicating that a bit stream output from the first device and displayed on a second device intends to be managed privately to the second device; and (a-2) the second device using a specific command to relay the request to the first device.

Furthermore, the specific command is a command defined in an audio-video control command transaction set for controlling audio/video signals including a bit stream between digital devices connected through a digital interface on a bus shared by the devices. In addition, the operation mode is is established based on the overall device, subunit, or a specific output plug, and in (b), preferably, a private mode is established in the overall device, subunit, or a specific output plug. In (c), preferably, if the first device establishes the private mode in the overall device, identification is performed with regard to devices pertaining to point-to-point or broadcast connection, while if the first device establishes the private mode in a specific unit or a specific output plug, the identification is made with regard to devices currently related to the subunit or output plug. The request for an access in (d) may be a read, requesting the third-party device to accept a bit stream, or a lock, requesting to lock a bit stream output from the first device. Finally, the digital interface may conform to the IEEE 1394 standard.

BRIEF DESCRIPTION OF THE DRAWINGS

The above object and advantages of the present invention will become more apparent by describing in detail preferred embodiments thereof with reference to the attached drawings in which:

FIG. 3A is a flowchart showing a method for managing a digital interface connection according to one embodiment of the prevent invention;

DETAILED DESCRIPTION OF THE INVENTION

Figure 1:
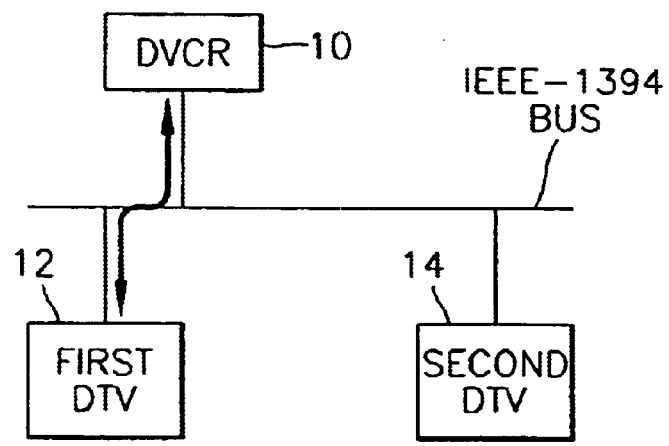
FIG. 1 is a diagram for explaining a conventional method for managing a digital interface connection.
Figure 2:
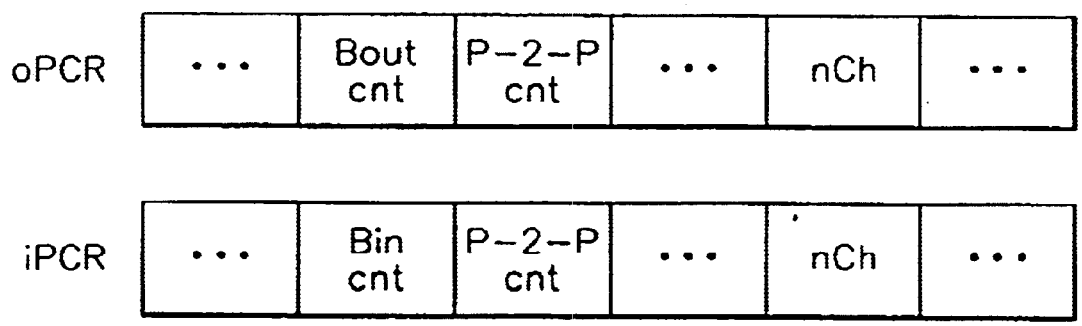
FIG. 2 is a diagram showing connection related fields of an output plug control register (OPCR) and an input plug control register (IPCR) used in the International Electrotechnical Commission (IEC) 61883 standard.
Figure 3B:
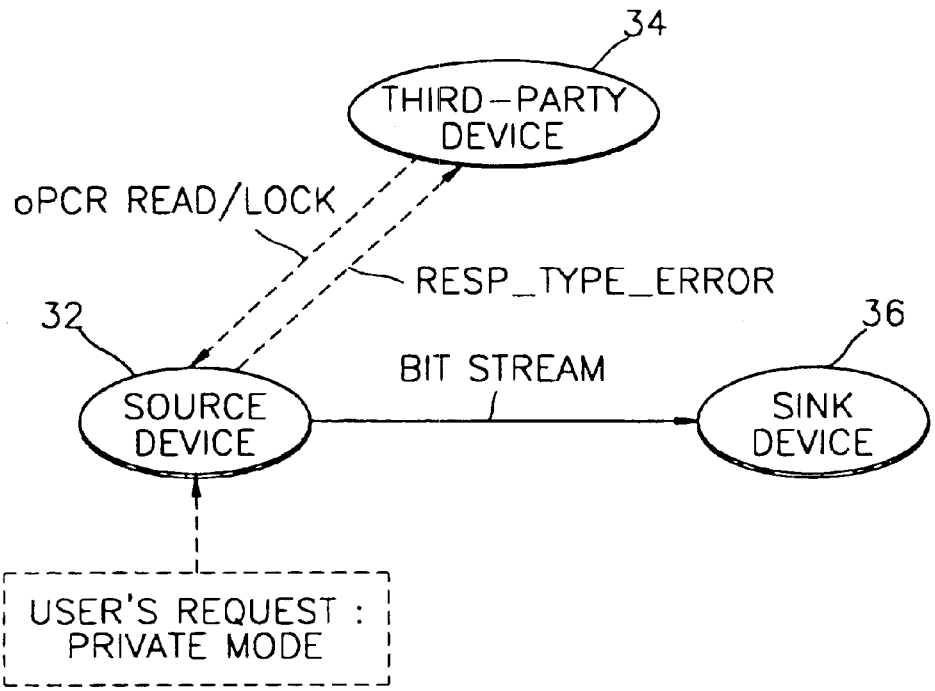
FIG. 3B is a diagram for explaining the operation according to the connection managing method shown in FIG. 3A.

A method for managing a digital interface connection according to one embodiment of the present invention will now be described with reference to FIGS. 3A and 3B. It is assumed that a digital interface, to which the connection method under the present invention is applied, is an interface which conforms to the Institute of Electrical and Electronics Engineers (IEEE)-1394 standard. According to the present invention, each device connected by a point-to-point or broadcast connection operates in one of a normal mode for performing a usual operation prescribed in a digital interface standard, for example, the IEEE 1394 standard, and a private mode for performing a specific operation in the present invention. One of these operation modes may be established based either on the overall device or on a subunit or output plug.

Initially, it is assumed that a connection between a source device 32 and a sink device 36 is made through channel number 33 (not shown) and that a bit stream output from source device 32 is transmitted to sink device 36. Here, the user requests source device 32 to establish an operation mode in a private mode (step 300). Such a request by the user may be made by a remote control used for controlling source device 32. Source device 32, to which such a command is transmitted, establishes the private mode in the overall device, a subunit or a specific output plug, in response to the command (step 302). Then, source device 32, which operates under the private mode, identifies devices which have the right to access the related registers to store the information (step 304). In this case, if source device 32 establishes the private mode in the overall device, devices subjected to such identification may correspond to devices pertaining to source device 32 by a point-to-point or broadcast connection. If source device 32 establishes the private mode in a specific subunit or a specific output plug, devices currently associated with the subunit or the output plug may be classified as the devices of such identification. Further, if there is a supervisor device due to the existence of the supervisor concept in the overall network, the supervisor device may be included in the devices having such right as described above.

Next, source device 32 determines whether there is an access by a third-party device to the related registers, in particular, whether there is a request for read and lock (step 306). If there is such a request, source device 32 determines whether a relevant third-party device is included in the devices stored in step 304 (step 308). Then, if it is determined that a relevant third-party device 34 is included in the stored device in step 308, source device 32 accepts such a request from third-party device 34 (step 310). Contrarily, if not, source device 32 returns an error code (RESP_TYPE_ERROR) to third-party device 34 (step 312), which indicates that source device 32 cannot accept the request (step 314).

Thus, because third-party device 34 fails to obtain the primary information (oPCR, or channel information) for establishing a point-to-point connection with source device 32 or establishing a broadcast-in connection between source device 32 and a channel from which a bit stream is output, it cannot normally access a bit stream that the user requests to manage privately. Accordingly, in the method for managing a digital interface connection according to the present invention, when a connection is established between digital devices, the user of the existing connection is able to control an access by a third-party device to a bit stream transmitted through the connection and to ensure privacy on the existing connection.

Figure 4B:
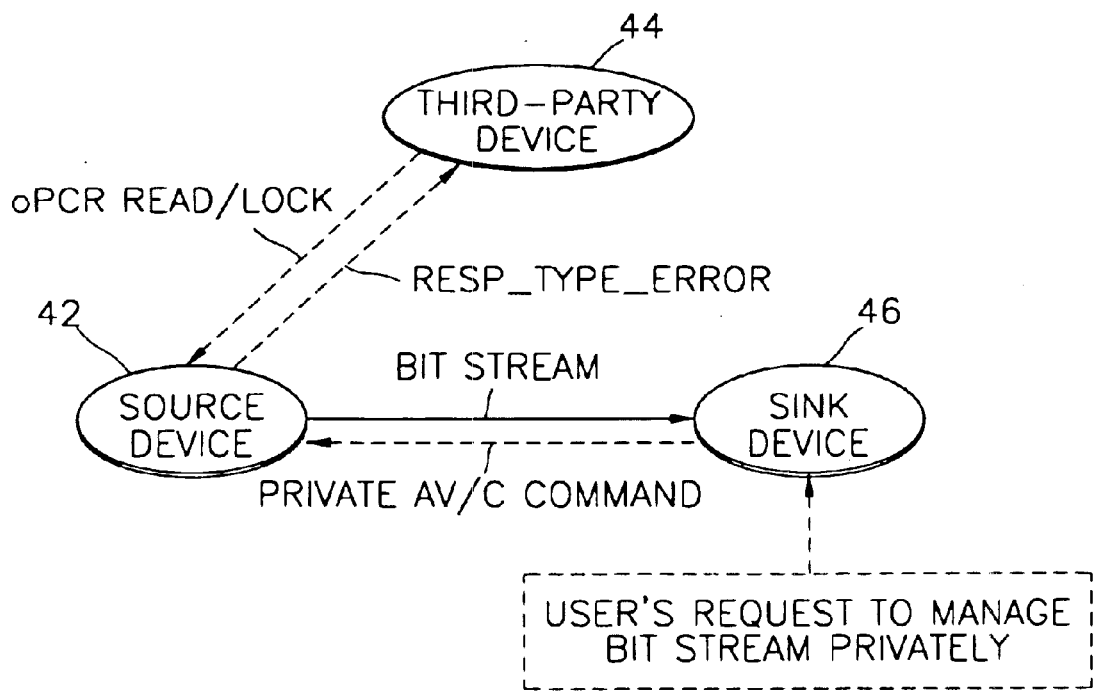
FIG. 4B is a diagram for explaining the connection managing operation according to the method shown in FIG. 4A.
Figure 4A:
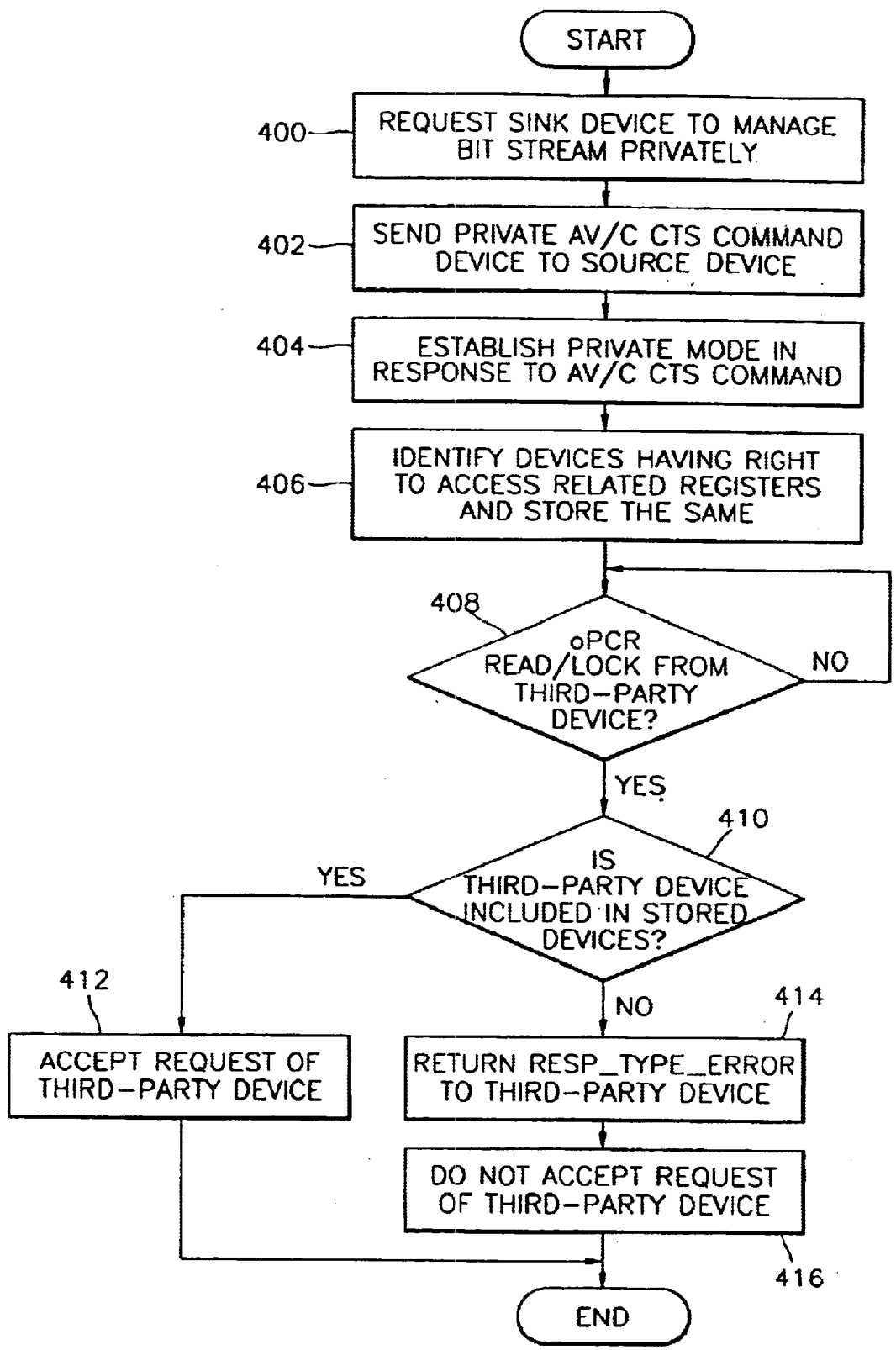
FIG. 4A is a flowchart showing a method for managing a digital interface connection according to another embodiment of the present invention.

Alternatively, according to another embodiment of the present invention, a sink device 46 may possibly manage a bit stream displayed on itself in a private way. A connection managing method according to another embodiment of the present invention will now be described with reference to FIGS. 4A and 4B. It is assumed that a digital interface, to which the connection managing method under the present invention is applied, is an interface which conforms to the IEEE 1394 standard. Referring to FIGS. 4A and 4B, the user sends a request to sink device 46, thereby demanding that a bit stream displayed on sink device 46 be managed privately (step 400). Such a request can be transmitted to sink device 46 by a remote control for controlling sink device 46. Sink device 46 receives the request to relay it to source device 42 using a specific command (step 402). It is possible to use a command defined in an audio-video control command transaction set (AV/C CTS) as the specific command for efficiently performing the control of audio/video (A/V) signals including a bit stream on a bus shared between digital devices connected through a digital interface.

Next, sink device 46 establishes an operation mode in a private mode in response to the request in the form of an AV/C CTS command (step 404). Then, source device 42, which operates under the private mode, identifies devices which have the right to access the related registers to store the resulting information (step 406). In this case, if source device 42 establishes the private mode in the overall device, devices subject to such identification may correspond to devices pertaining to source device 42 by a point-to-point or broadcast connection. If source device 42 establishes the private mode in a specific subunit or a specific output plug, devices currently associated with the subunit or the output plug may be classified as the same. Further, if there is a supervisor device due to the existence of the supervisor concept in the overall network, the supervisor device may be included in the devices having such right as described above.

Next, source device 42 determines whether there is an access by a third-party device to the related registers, in particular, whether there is a request for read and lock (step 408). If there is a request, source device 42 determines whether the relevant third-party device is included in the devices stored in step 406 (step 410). Then, if it is determined that a relevant third-party device 44 is included in the stored device in step 410, source device 42 accepts such a request from third-party device 44 (step 412). Contrarily, if not, source device 42 returns an error code (RESP_TYPE_ERROR) to third-party device 44 (step 414), which indicates that source device 42 cannot accept the request (step 416).

Thus, in the case where the user requests the privatization of a bit stream through sink device 46, because third-party device 44 fails to obtain the primary information (OPCR, or channel information) for establishing a point-to-point connection with source device 42 or establishing a broadcast-in connection between source device 42 and a channel from which a bit stream is output, it cannot normally access a bit stream that the user requests to manage privately. Accordingly, in the method for managing a digital interface connection according to the present invention, when a connection is established between digital devices, the user of the existing connection is able to control an access by a third-party device over a bit stream transmitted through the connection and to ensure privacy on the existing connection.

The above method may be written as a program which can be executed on a computer including a microprocessor or processor. Further, the program can be stored on a recording medium such as a magnetic recording medium or an optical recording medium. Preferably, the program can be held in a memory such as read-only memory (ROM) and flash memory. In addition, the program can be scattered within the devices connected by a digital interface to be stored and executed thereon.

A flash memory, in which a program for implementing the above method is stored, and a microprocessor, which reads out the program from the flash memory to execute the program, constitute firmware for performing a control operation on devices connected to a digital interface. Further, the control operation performed by firmware acts as software such as a protocol performed between devices linking through a digital interface, as understood by a person skilled in the art.

Further, although the embodiments are described with reference to use of a command defined in AV/C CTS as a specific command, it is only for explanation and it is possible to use a command defined in other kinds of control protocols such as home wide web (HWW), home audio/video interoperability (HAVi), computer-assisted learning (CAL), and EHS. In other words, the present invention is not restricted to the embodiments nor do the embodiments limit the scope of the invention as defined by the claims.

As described in the foregoing, a method for managing a digital interface connection according to the present invention enables the user of the existing connection to control access to a bit stream transmitted through the connection by a third-party device, while ensuring privacy in a connection between digital devices.

What is claimed is:

1. A connection managing method of a digital interface for performing a connection management for a plurality of devices connected by a digital interface, the plurality devices including operation modes having a normal mode for performing a usual operation prescribed in a digital interface standard and a private mode for performing an operation which selectively controls an external device, the method comprising the steps of:

(a) establishing the private mode as an operation mode in a first arbitrary device for a digital connection between the first arbitrary device and a second arbitrary device;

(b) the first device identifying devices having a right to access related registers to store in itself information relating to the identified devices, wherein the identified devices having a right to access the related registers are allowed access to the digital connection between the first arbitrary device and the second arbitrary device;

(c) the first device determining whether there is a request for access to the related registers by a third-party device;

(d) determining whether the third-party device is included in the previously stored devices if there is a request;

(e) the first device accepting the request of the third-party device if the third-party device is determined to be included in the devices stored in the step (d); and (f) the first device returning an error code to the third-party device, which indicates that the first device cannot accept the request, if the third-party device is not determined to be included in the devices stored in the step (d).

2. The method of claim 1, wherein the establishment of the operation mode is made on the basis of the overall device, subunit, or a specific output plug, and in the step (a) a private mode is established in the overall device, subunit, or a specific output plug.

3. The method of claim 1, wherein (a) comprises:

(a-1) sending a request indicating that a bit stream output from the first device and display on the second device intends to be managed privately to the second device; and (a-2) the second device using a specific command to relay the request to the first device.

4. The method of any of claims 1, 2 and 3, wherein the digital interface conforms to the IEEE 1394 standard.

* * * * *